(12) United States Patent
Kumar et al.

(10) Patent No.: US 8,762,567 B2
(45) Date of Patent: *Jun. 24, 2014

(54) ADAPTIVE PERMUTATION GROUP METHOD FOR OVERLOAD CONTROL

(75) Inventors: Gopal N. Kumar, Morristown, NJ (US); Subhabrata Bapi Sen, Chatham, NJ (US); Ganapathy Subramanian Sundaram, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 3192 days.

This patent is subject to a terminal disclaimer.

(21) Appl. No.: 10/917,988

(22) Filed: Aug. 13, 2004

(65) Prior Publication Data

US 2006/0036737 A1 Feb. 16, 2006

(51) Int. Cl.
*G06F 15/16* (2006.01)
(52) U.S. Cl.
USPC .......................... 709/235; 709/226; 709/206
(58) Field of Classification Search
USPC .......................... 709/223–224, 226, 234–235
See application file for complete search history.

(56) References Cited

U.S. PATENT DOCUMENTS

| | | | |
|---|---|---|---|
| 4,616,359 A * | 10/1986 | Fontenot | 370/230 |
| 4,974,256 A | 11/1990 | Cyr et al. | |
| 5,463,620 A | 10/1995 | Sriram | |
| 5,548,533 A | 8/1996 | Gao et al. | |
| 5,828,653 A | 10/1998 | Goss | |
| 5,970,048 A | 10/1999 | Pajuvirta et al. | |
| 6,327,361 B1 | 12/2001 | Harshavardhana et al. | |
| 6,442,139 B1 * | 8/2002 | Hosein | 370/236 |
| 6,453,327 B1 | 9/2002 | Nielsen | |
| 6,501,733 B1 * | 12/2002 | Falco et al. | 370/235 |
| 6,546,366 B1 | 4/2003 | Ronca et al. | |
| 6,654,374 B1 | 11/2003 | Fawaz et al. | |
| 6,898,182 B1 | 5/2005 | Cloonan | |
| 6,940,813 B2 * | 9/2005 | Ruutu | 370/231 |
| 6,947,445 B1 | 9/2005 | Barnhart | |
| 7,170,900 B2 | 1/2007 | Berggreen | |
| 7,187,651 B1 | 3/2007 | Volftsun et al. | |
| 7,266,612 B1 | 9/2007 | Heyman | |
| 7,295,516 B1 | 11/2007 | Ye | |
| 7,301,905 B1 | 11/2007 | Tontiruttananon et al. | |
| 7,430,582 B1 | 9/2008 | Bates et al. | |
| 2004/0019646 A1 | 1/2004 | Zweben et al. | |
| 2005/0127157 A1 | 6/2005 | Stemmle et al. | |
| 2006/0036737 A1 | 2/2006 | Kumar et al. | |
| 2010/0257009 A1 * | 10/2010 | Liu et al. | 705/8 |

OTHER PUBLICATIONS

Kasera et al.; "Fast and Robust Signaling Overload Control" pp. 1-13. Publication date: Nov. 2001.*
Welsh et al.; "Adaptive Overload Control for Busy Internet Servers" pp. 43-57. Publication date Jan. 6, 2003.*
Sally Floyd and Van Jacobson, "Random Early Detection Gateways for Congestion Avoidance," IEEE/ACM Transactions on Networking, 1(4):397-413, Aug. 1993.

(Continued)

*Primary Examiner* — Mohamed Ibrahim
(74) *Attorney, Agent, or Firm* — Carlson, Gaskey & Olds

(57) ABSTRACT

A communication network includes an overload control algorithm that adapts to changing circumstances. In a disclosed example, an acceptance fraction for each of a plurality of message types depends upon the arrival rates of the message types. As at least one of the arrival rates changes, the acceptance fraction is responsively changed to provide an overload control algorithm that adapts to changes in message traffic.

12 Claims, 1 Drawing Sheet

(56) References Cited

OTHER PUBLICATIONS

S. Kasera, J. Pinheiro, C. Loader, M. Karaul, A. Hari, and T. LaPorta, "Fast and Robust Signaling Overload Control," IEEE INFOCOM, 2001.

D. Lin and R. Morris, "Dynamics of Random Early Detection," SIGCOMM 97—Computer Communications Review, 27(4), 1997.

B. Hajek, "Extremal Splittings of Point Processes," Mathematics of Operations Research, 10:543-556, 1985.

Karam, Mansour J. and Tobagi, Fouad A., "On Traffic Types and Service Classes in the Internet," 0-7803-6451-1/00; IEEE Xplore, pp. 548-554.

Kasera, Sneha, et al., "Fast and Robust Signaling Overload Control," Bell Laboratories, Lucent Technologies, 1092-1658/01 @2001 IEEE, pp. 323-331.

Kasera, Sneha, et al., "Robust Multiclass Signaling Overload Control," Proceedings of the 13th IEEE International Conference on Network protocols, 0-7695-2437-8/05, 10 pages.

Ny, Louis-Marie Le and Tuffin, Bruno, "Modeling and Analysis of Multi-Class Threshold-Based Queues With Hysteresis Using Stochastic Petri Nets," ICATPN 2002, LNCS 2360, pp. 254-272, 2002.

Pinheiro, J., et al, "Robust Multi-Class Signaling Overload Control for Wireless Switches," Bell Labs Research, pp. 1-24.

\* cited by examiner

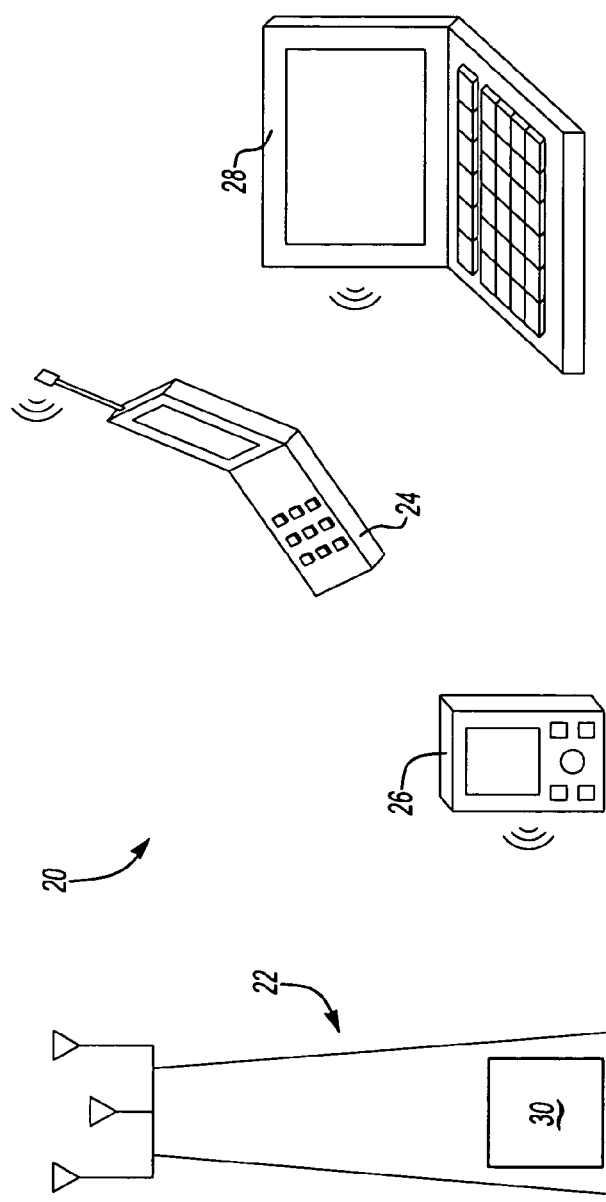
_Fig-1_
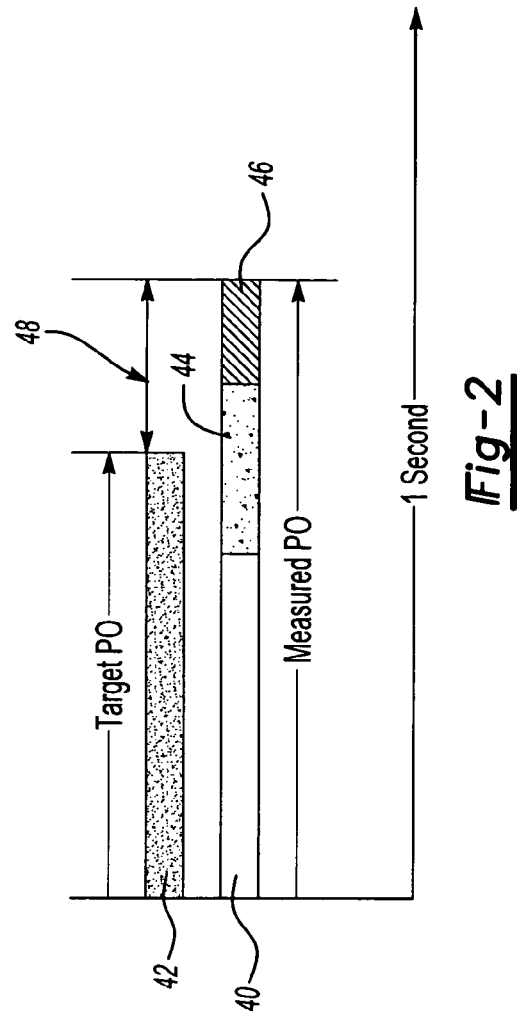
_Fig-2_

ADAPTIVE PERMUTATION GROUP METHOD FOR OVERLOAD CONTROL

FIELD OF THE INVENTION

This invention generally relates to telecommunications, and more particularly to wireless communication systems.

DESCRIPTION OF THE RELATED ART

Wireless communication systems have grown increasingly in popularity and in capabilities. Current systems provide voice communication, data communication and other multimedia applications. As technology progresses, the capabilities in these areas continue to improve.

Managing the flow of information in such systems is of critical importance. For example, a variety of messages must be processed by a system controller for optimal communications to be maintained. Typical controllers or processors have a maximum capacity. Under most circumstances, the capacity is not reached and the processor occupancy (PO) is at a level that allows for effective maintenance of the desired communications among subscribers within a network, for example. There are times, however, when the PO exceeds the controller capacity and measures must be taken to handle such overload situations.

Data flow in a wireless network is typically bursty; there may be periods with low volumes and others with high volumes. It follows that even with a manageable average traffic volume, a processor may experience instantaneous processing loads that exceed the average value and may exceed the processor capacity. Such situations must be dealt with effectively to avoid end-to-end delays and other quality-of-service deteriorations. Handling an overload situation and minimizing the amount of time it would take to recuperate from such a situation is important. Ideally, processors are protected from overload situations using overload control algorithms.

Known overload control algorithms react to an overload situation by reducing a processor's exposure to message processing loads. Typical messages included are signaling messages, data-payload or operations messages and maintenance messages. A typical algorithm will drop or delay some of these messages using some form of negotiation with the source or buffer for some of the messages to effectively reduce the number of messages to be handled by the processor in a given interval. Some algorithms combine dropping and delaying techniques. The effectiveness of an algorithm depends upon how it reacts to different messages. Some algorithms do not discriminate among messages while others recognize relative message priorities and use such information when deciding what message (s) to drop or delay.

System performance metrics determine how important a given message is. Some overload control algorithms include attributing importance to different message types. Relative priorities of messages sometimes dictate how messages are to be dropped during overload situations. For example, if there are multiple classes of subscribers based upon their subscription rates, those paying more for services will have higher priority than those paying less. Some message types are higher priority based on content.

Simply dropping the lowest priority messages may not solve an overload problem where a large number of high priority messages are arriving within a certain time interval. An overload algorithm must be able to determine how many messages of each priority should be dropped to address an overload situation.

One major shortcoming of typical overload control algorithms is that they establish a set of rules for controlling an overload situation that do not change even though there are changing responsive to changing conditions at a processor. There is a need for an improved overload control algorithm that is adaptive to changes such in the flow of messages so that effective overload control is maintained under a wider variety of circumstances. This invention addresses that need by providing an overload control approach that is responsive to changing arrival rates of messages to adapt the overload control responsive to current conditions.

SUMMARY OF THE INVENTION

An example method of handling message overload designed according to an embodiment of this invention includes changing an acceptance fraction responsive to a changing arrival rate of messages.

In one example, an arrival rate for each of a plurality of message classes is determined. An acceptance fraction for each of the message classes is also determined. In one example, at least one of the message class acceptance fractions is changed responsive to a changing arrival rate of at least one of the types of messages.

In another example, an overall acceptance fraction is based upon a current processor occupancy and a target processor occupancy. The acceptance fraction for each of the message classes is based on the overall acceptance fraction.

The various features and advantages of this invention will become apparent to those skilled in the art from the following detailed description. The drawings that accompany the detailed description can be briefly described as follows.

BRIEF DESCRIPTION OF THE DRAWINGS

FIG. 1 schematically illustrates selected portions of a wireless communication network.

FIG. 2 schematically illustrates the arrival rates of multiple classes of messages and their contribution to a processor occupancy level.

DETAILED DESCRIPTION

FIG. 1 schematically illustrates a wireless communication system 20 that includes a base station 22 and a plurality of mobile units 24, 26 and 28. The mobile units are any of a variety of commercially available communication devices that are capable of data or voice transmissions through a wireless communication interface such as a cell phone 24, a personal digital assistant 26 or a notebook computer 28. Of course, this invention is not limited to any particular mobile unit. The illustrated examples are provided to show different types of user devices that may be used.

The base station 22 includes a system controller 30 that includes known radio equipment and signal processing equipment that is useful for generating and processing data and communication signals in a wireless network. The controller 30, for example, includes the necessary electronics and software for deciphering and managing messages received at the base station. The message processor portion of the controller 30 may take a variety of known forms. It should also be noted that a processor need not be located at a base station or be directed linked with a base station for it to benefit from the overload control provided by this invention.

The message processor of the controller 30 receives a variety of messages during normal system communications. Various message types are known. During situations where the processor occupancy (PO) reaches a threshold, which may correspond to the processor capacity or may be set at a lower limit, overload control becomes necessary. According to one example, the overload control sets an acceptance fraction for each of a plurality of message types or classes. There are known techniques for identifying message types and assigning acceptance fractions to different message types. The acceptance fractions dictate whether a particular message will be throttled as part of an overload control procedure. Throttling may include delaying processing of a message, dropping a message or a combination of them.

According to one example, the acceptance fraction for each message type depends upon the arrival rate of the corresponding message type at a given time (i.e., during a control interval). By changing the acceptance fraction responsive to a changing arrival rate, the example overload control adapts to various communication situations to provide optimized overload control.

For example, when the arrival rate of high priority messages exceeds that of low priority messages, it may be advisable to drop more high priority messages compared to a situation where the arrival rate of high priority messages is relatively low compared to low priority messages. Monitoring the arrival rate, using known techniques, provides for changing the acceptance fraction for at least one message type when the arrival rate for that (or another) message type changes in a manner that makes overload control more efficient if the acceptance fraction were changed.

In one example, an overall acceptance fraction is determined for a processor. An acceptance fraction for each message type, class or priority also is determined. The overall acceptance fraction, in part, determines the acceptance fraction for each different message type. The priority or importance assigned each message type also dictates the acceptance fraction for each. According to this example, the arrival rate associated with each message type also dictates each acceptance fraction. As an arrival rate changes, the acceptance fraction may be changed for better overload control. In one example, multiple acceptance fraction changes are made when even one arrival rate changes.

By utilizing a relationship between arrival rate and acceptance fraction, the disclosed approach adapts to changing overload conditions in a manner that is far superior to prior overload control algorithms that were not capable of adapting to non-stationary criteria such as arrival rate. One example adaptive permutation group method that includes arrival rate as a factor when determining an acceptance fraction can be appreciated from the following.

As the primary function of an overload control algorithm is to stabilize PO under certain performance constraints if present, an initial step is to determine the fraction of incoming messages to be throttled. If there are M classes of messages, each having an arrival rate of $a_i$ and a processing requirement of $K_i (i=1, \ldots, M)$, expressed in units of seconds, then the time in seconds for which the processor will be busy during 1 second is $$\sum_{i=1}^{M} a_i K_i.$$

The percentage PO occupancy is $$100 * \sum_{i=1}^{M} a_i K_i.$$

FIG. 2 illustrates a case with three message classes and different arrival and processing times. The net contributions to PO from the three classes are shown schematically. A number of messages from a first class 40 contribute more than one-half of the PO 42. A number of second class messages 44 take up less of the processor capacity. A third class 46 occupies still less. In this example, any two classes combined exceed the target PO 50 overload control must include more than simply dropping the second class messages 44 or the third class 46. The illustration does not reflect contributions from the instantaneous arrival of the different message classes but depicts an aggregated contribution from each of the three classes.

In a mathematical sense, overload control defines an acceptance fraction for each of the message classes so that the net contributions will be close to the target PO. In other words, the contribution from the dropped or delayed messages will amount to the excess PO shown at 48.

The output of an example overload control algorithm can be expressed by a set of acceptance fractions or rejection fractions and these are related to one another by the equation rejection fraction=(1−acceptance fraction) for each message class.

Assuming all messages have equal importance, any message can be dropped when there is a need to drop messages. There is no special set of preferences that guides the dropping process. The acceptance fraction can be determined easily to be:

$$f_{po} = \frac{PO_{target}}{PO_W}$$

$$f_t = f * f_{po}$$

Initial-condition: f=1;

The role of $f_{MIN}$ is to prevent an extremely sluggish response and to facilitate recovery of the overload control algorithm from high overload conditions. Processor occupancy is calculated as the average processor occupancy calculated over a measurement window of duration W. Hence the subscript 'W' in the denominator. If the above expression were used without any heed to its past, the resulting control will be unstable as the system would react to only instantaneous conditions and therefore can potentially over react or under react. In order to induce more memory of the past conditions, a recursive formulation is favored. Doing so, the acceptance fraction can be expressed as:

f=max(min(f$_p$1), f$_{MIN}$)

Given an acceptance fraction, a simple bit generator is used to generate 1s and 0s with the fraction of 1s equal to the acceptance fraction. This can be accomplished in a known manner.

If the overload levels exceed 100% of PO, then arrival rate information is used to calculate the acceptance fraction. There is a target arrival rate and the acceptance fraction is calculated according to the following formula:

$$f_{po} = \frac{PO_{target}}{PO_W}$$

$$f_{arrival} = \frac{a_{target}}{a_W}$$

$$f_t = \max(\min(f_{po}, f_{arrival}, 1), f_{MIN})$$

$$f = f * f_t$$

The PO is comprised of varying mixes of contributions from different message classes due to their different arrival rates and processing times. The excess PO to be shed (i.e., by dropping or delaying messages) will have to take into consideration message priorities. The actual composition will depend on the arrival rate statistics, processing requirements and relative priorities.

In one example, each priority class has its own rejection fraction that the overload control algorithm determines. Generating individual pseudo-random bit generators for each class is computationally inefficient. This problem is overcome by defining a stochastic parameter, called the residue; when a message from priority class, j, arrives, the current value of the residue is checked against a pre-computed critical value (CV). If the residue for a message is less than the critical value, the message is throttled. Otherwise, the message is accepted. The methodology behind an example residue method can be understood by an example Cyclic Permutation Group method (CPGM).

With the CPGM, two factors are tracked as the algorithm proceeds, quantity (size) that is accepted, $A(i)$, and the total quantity (size) of packets that have arrived, $T(i)$.

The decision to accept or reject a packet of computational requirement $K_{(i+1)}$ at the (i+1) instance is given by the sequence:

$$Z(i+1) = \begin{cases} 1; & \frac{A(i) + K(i+1)}{T(i+1)} < f + \frac{K(i+1)}{\beta T(i+1)} \\ 0; & \text{otherwise} \end{cases}$$

$$A(i+1) = \begin{cases} A(i) + K_{(i+1)}; & Z(i+1) = 1 \\ A(i); & Z(i+1) = 0 \end{cases}$$

$$T(i+1) = T(i) + K_{(i+1)}$$

The role of $\beta$ is to determine at what point an acceptance is granted. The residue method can be derived from the CPGM by the following transformations.

$$R = f * T - A;$$

$$R + f * K_i \geq \frac{K_i}{2}: \text{Accept}$$

$$R + f * K_i < \frac{K_i}{2}: \text{Reject}$$

$$R = \begin{cases} R - (1-f) * K_i: & \text{Update} - \text{rule} - \text{after} - \text{acceptance} \\ R + f * K_i: & \text{update} - \text{rule} - \text{after} - \text{rejection} \end{cases}$$

Further in terms of the critical value (CV) for each priority class, the acceptance methodology is as follows:

$R < CV_j$: Reject $R \geq CV_j$: Accept

The fundamental difference between the residue expression and the CV expression is that the CV expression incorporates message priorities. If the arrival rate statistics do not vary with time, then the CV values for each priority class is different but kept constant. The stochastic nature of a residue value depends on the value of the acceptance fraction and where the CV levels are set. In one example system, a priority definition is addressed by choosing different relative value for the CVs. Given this description, those skilled in the part will be able to select appropriate values to suit their particular needs.

Given arrival rate distribution and processing requirements for the different messages, the normalized PO contribution from a message type j is given by:

$$po_j = \frac{a(j) * K_j}{\sum_{i=1}^{M} a(i) * K_i}$$

Where the numerator represents the unit cost of one message j and the denominator represents the total PO. The condition for stability is:

$$\sum_{i=1}^{P} p(i) * po_j = C.$$

In one example, M is the number of message classes and C is the normalized capacity (equal to 1 for completely deterministic systems, and greater than 1 for stochastic systems). Because $po_j$ is a function of the arrival rate a, this relationship allows for determining an acceptance fraction in a manner that adapts to changing arrival rates. The $p(i)$ depict the instantaneous priority assignments that determine message class membership in the set of selected messages from relative priorities and arrival rate information. For a message class j, this can be considered as the product $\rho_{min} * \rho_j$, where $\rho_j$ is the relative priority of the message class j (compared to the minimum priority message whose relative priority value is set to 1) and a $\rho_{min}$ chosen to satisfy the stability equation shown above. The stability equation can be written as:

$$\sum_{i=1}^{M} \rho_{min} * \rho_i * po_i = c \Rightarrow \rho_{min} = \frac{C}{\sum_{i=1}^{M} \rho_i * po_i}$$

$$p(i) = \rho_i * \rho_{min}$$

By sorting and naming the message numbers appropriately, the first message can be considered to be least critical having a relative priority value of 1. This would indicate that other messages would have instantaneous priority values given by:

$$p(1) = \rho_{min}$$

$$p(i) = \rho_i * \rho_{min}; 1 < i \leq M$$

The corresponding critical values for these different message classes are:

$$CV_i = K_i * \left(\frac{1}{2} - p(i)\right);$$

The value of normalized capacity, C, is 1 if the system is deterministic. But, in general the system is not, and a value greater than 1 is preferred. Larger values of C will tend to bias towards acceptance and smaller values toward rejection.

This example method gives a way to determine the critical values in a closed form manner. This closed-form representation deals with time varying arrival rates.

The arrival rate statistics determine instantaneous priority values. The closed-form solution for the critical values factor in this information. Evaluation of CVs when arrival rates change provides a more robust overload control than by keeping CV values fixed over all arrival rate profiles. The closed-form CV expression can be used to adaptively update CV values.

The disclosed approach determines the acceptance (or rejection) fraction based on the extent of the overload, the message type priorities and the arrival rates of the different priority classes. Accordingly, the disclosed approach provides an overload control algorithm that reacts more closely to the actual conditions occurring in a communication network. The extent of the overload specifies the overall acceptance fraction and each message type can be given a separate acceptance fraction based upon that message type priority. Modifying the acceptance fraction for at least one of the message types responsive to a changing arrival rate in at least one of the message types allows the overload control algorithm to adapt to changing the circumstances to provide more consistent and reliable overload control.

Given this description, those skilled in the art will be able to select where to incorporate arrival rate information into an overload control algorithm to realize the benefits of this invention. The disclosed example uses $P_{min}$, which is a function of arrival rate, when determining the critical value. Another approach that modifies an acceptance fraction responsive to a changing or different arrival rate can fit within the scope of legal protection given to this invention.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of handling message overflow, comprising:
    determining an arrival rate of each of a plurality of message classes;
    changing an acceptance fraction responsive to a changing arrival rate of messages; and
    processing at least one message according to the changed acceptance fraction.

2. The method of claim 1, comprising determining an acceptance fraction for each of the plurality of message classes.

3. The method of claim 2, comprising determining an overall acceptance fraction based on a current processor occupancy and a target processor occupancy and determining the acceptance fraction for each of the message classes based on the overall acceptance fraction.

4. The method of claim 3, comprising changing the overall acceptance fraction.

5. The method of claim 2, comprising individually changing at least one of the message class acceptance fractions.

6. The method of claim 5, comprising changing at least two of the acceptance fractions at a time.

7. A method of handling message overflow, comprising:
    determining an amount of overload, a priority of messages from each of a plurality of priority classes and an arrival rate of messages in each priority class;
    changing an acceptance fraction responsive to a changing arrival rate of messages for at least one of the classes if the amount of overload exceeds a threshold; and
    processing at least one message according to the changed acceptance fraction.

8. The method of claim 7, wherein the acceptance fraction dictates how many messages to drop or delay if there is overload.

9. The method of claim 7, comprising determining a unit cost of an incoming message as a function of the arrival rate and determining a contribution to the overload based upon the unit cost.

10. A method of handling message overflow, comprising:
    changing an acceptance fraction responsive to a changing arrival rate of messages;
    determining a critical value and changing the critical value responsive to the changing arrival rate; and
    processing at least one message according to the changed acceptance fraction.

11. The method of claim 10, comprising determining the critical value for each of a plurality of message classes.

12. A method of handling message overflow, comprising:
    determining instantaneous priorities based on arrival rates and absolute priorities for a given normalized processor capacity;
    changing an acceptance fraction responsive to a changing arrival rate of messages; and
    processing at least one message according to the changed acceptance fraction.

* * * * *